United States Patent
Henry et al.

(10) Patent No.: US 10,897,722 B2
(45) Date of Patent: Jan. 19, 2021

(54) ENHANCING VISIBILITY IN A HETEROGENEOUS NETWORK

(71) Applicant: Cisco Technology, Inc., San Jose, CA (US)

(72) Inventors: Jerome Henry, Pittsboro, NC (US); Mark Allen Webb, Troy, MI (US); Indermeet Singh Gandhi, Bangalore (IN); John Martin Graybeal, Califon, NJ (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 15/792,477

(22) Filed: Oct. 24, 2017

(65) Prior Publication Data

US 2019/0124541 A1 Apr. 25, 2019

(51) Int. Cl.
| | |
|---|---|
| H04W 28/02 | (2009.01) |
| H04L 12/813 | (2013.01) |
| H04L 12/66 | (2006.01) |
| H04L 29/06 | (2006.01) |
| H04W 8/00 | (2009.01) |
| H04W 84/12 | (2009.01) |
| H04W 88/06 | (2009.01) |

(52) U.S. Cl.
CPC ......... *H04W 28/0215* (2013.01); *H04L 12/66* (2013.01); *H04L 47/20* (2013.01); *H04L 69/18* (2013.01); *H04W 28/0273* (2013.01); *H04L 69/08* (2013.01); *H04L 2212/00* (2013.01); *H04W 8/005* (2013.01); *H04W 28/0247* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | |
|---|---|---|
| 9,357,410 B2 | 5/2016 | Nedeltchev et al. |
| 9,374,835 B2 | 6/2016 | Mallya et al. |
| 9,559,866 B2 | 1/2017 | Grayson et al. |

(Continued)

FOREIGN PATENT DOCUMENTS

WO 2016011011 A1 1/2016

OTHER PUBLICATIONS

R. Valmikam et al., "Extensible Authentication Protocol (EAP) Attributes for Wi-Fi Integration with the Evolved Packet Core", Internet Engineering Task Force (IETF), Request for Comments: 7458, Category: Informational, ISSN: 2070-1721, Feb. 2015, 18 pages.

(Continued)

*Primary Examiner* — Gregory B Sefcheck

(57) ABSTRACT

A method for providing enhanced visibility in heterogeneous network. The method comprises receiving, at a networking device housing a cellular base station and a WLAN access point, cellular network traffic from an electronic device. The method further comprises receiving, at the networking device, WLAN traffic from the electronic device and encapsulating, at the networking device, the cellular network traffic and the WLAN traffic using a common protocol. The method further comprises transmitting the encapsulated cellular traffic and the encapsulated WLAN traffic to a controller.

20 Claims, 6 Drawing Sheets

(56) References Cited

U.S. PATENT DOCUMENTS

| | | | | |
|---|---|---|---|---|
| 2016/0165481 | A1* | 6/2016 | Jin | H04W 72/0486 |
| | | | | 370/236 |
| 2016/0330743 | A1* | 11/2016 | Das | H04W 76/10 |
| 2017/0041827 | A1* | 2/2017 | Chou | H04W 76/27 |
| 2017/0078890 | A1* | 3/2017 | Zhu | H04W 16/14 |
| 2017/0099625 | A1* | 4/2017 | Li | H04W 28/08 |
| 2017/0111822 | A1 | 4/2017 | Jung et al. | |
| 2017/0295103 | A1* | 10/2017 | Starsinic | H04L 41/0816 |
| 2017/0310640 | A1* | 10/2017 | Chechani | H04W 12/08 |
| 2017/0374579 | A1* | 12/2017 | Wang | H04W 28/0278 |
| 2019/0059015 | A1* | 2/2019 | Lee | H04W 28/06 |
| 2019/0124545 | A1* | 4/2019 | Gandhi | H04W 36/30 |
| 2019/0260608 | A1* | 8/2019 | Baboescu | H04W 76/12 |

OTHER PUBLICATIONS

3GPP Organizational Partners, "3rd Generation Partnership Project; Technical Specification Group Core Network and Terminals; Access Network Discovery and Selection Function (ANDSF) Management Object (MO) (Release 14)", 3GPP TS 24.312 V14.1.0, Jun. 2017, 394 pages.

* cited by examiner

ENHANCING VISIBILITY IN A HETEROGENEOUS NETWORK

TECHNICAL FIELD

The present disclosure relates generally to wireless networking, and in particular, management of heterogeneous network traffic flows with enhanced traffic visibility.

BACKGROUND

Various electronic devices can wirelessly communicate over multiple communications networks (e.g., using multiple communication standards). For example, an electronic device (also referred to as "user equipment" (UE)) can include hardware that enables wireless communication with both wireless local area networks (e.g., using 802.11-based standards such as WiFi) and cellular networks (e.g., using 3G, 4G, LTE, or 5G). Some systems use a controller to control UE authentication, UE access to networks, and whether UE traffic should be routed through the cellular network or wireless local area network.

Previous systems disclose a network topology wherein the controller is part of a traffic path associated with a single network. Consequently, the controller has limited visibility into overall network traffic flows, limiting its effectiveness in controlling the UE. Greater visibility into overall network traffic flows would allow the controller to implement a more effective strategy of UE control.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
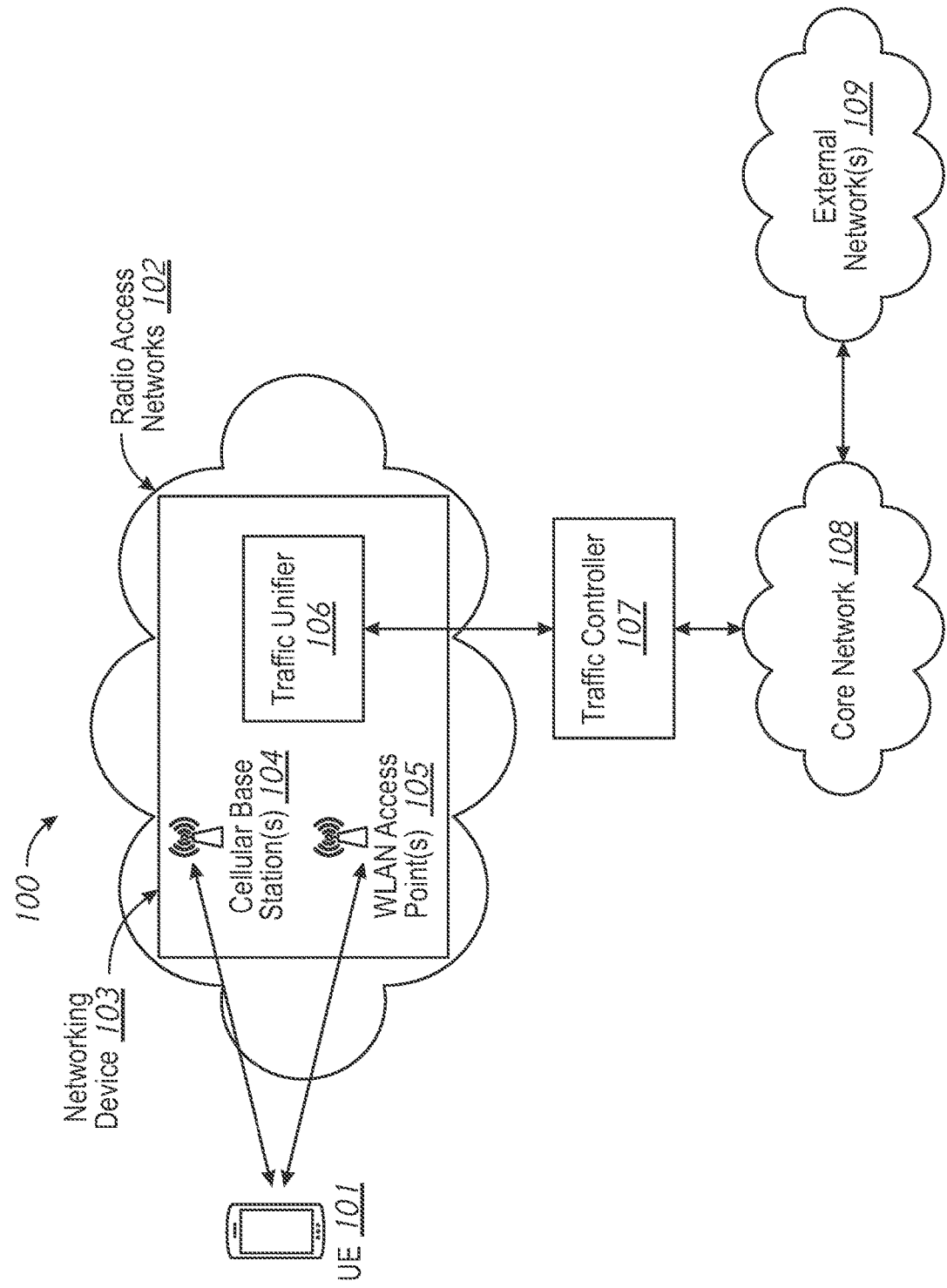
FIG. 1 is a block diagram of a wireless communication environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for management of heterogeneous network traffic flows with enhanced traffic visibility. The method comprises receiving, at a networking device housing a cellular base station and a WLAN access point, cellular network traffic from an electronic device, and receiving, at the networking device, WLAN traffic from the electronic device. The method further comprise encapsulating, at the networking device, the cellular network traffic and the WLAN traffic using a common protocol, and transmitting the encapsulated cellular traffic and the encapsulated WLAN traffic to a controller.

FIG. 1 is a block diagram of a wireless communications environment 100. The wireless communication environment includes a UE 101 (e.g., cell phone, tablet, laptop, etc.) in wireless communication with multiple radio access networks (RANs) 102. Each RAN of the RANs 102 provides the UE 101 with connectivity to external network(s) 109 (e.g., the Internet). In various implementations, the UE 101 has multiple wireless radios, enabling it to communicate with the multiple RANS 102. In various implementations, the UE 101 has a wireless radio capable of communication with a cellular network RAN and a wireless radio capable of communication with a WLAN. Although only a single UE 101 is illustrated in FIG. 1, it is to be appreciated that various wireless communication environments include multiple UEs. Each RAN of the RANs 102 implements a Radio Access Technology (RAT). Because the wireless communication environment 100 includes multiple RANs implementing different RATs, the wireless communication environment 100 may be referred to as a "heterogeneous wireless network (HWN)" and/or "heterogeneous network (HetNet)."

The wireless communications environment 100 includes a networking device 103 that provides the UE 101 with connectivity to the RANs 102. In various implementations, the networking device 103 is a "small cell" device (e.g., on the scale of femtocells, picocells, and/or microcells). In various implementations, the networking device 103 operates under a frequency-division multiplexing (OFDM) scheme compliant with the 5G wireless RAT, such as "new radio (NR)."

In various implementations, a RAN of the RANs 102 implements a WLAN RAT (e.g., 802.11 standards, such as WiFi). The networking device 103 includes a WLAN access point 105. The WLAN access point 105 provides the UE 101 with connectivity to the WLAN. In various implementations, the WLAN access point 105 is 802.11-compliant. In various implementations, one or more WLAN access points 105 are managed through a control protocol. For example, in various implementations, one or more WLAN access points 105 are managed through a control and provisioning of wireless access points (CAPWAP) protocol.

In various implementations, a RAN of the RANs 102 implements a cellular RAT (e.g., a 3GPP defined standard, such as 3G, 4G, LTE, and/or 5G). In various implementations, the cellular network RAN operates in an unlicensed spectrum (e.g. LTE-U, LAA for LTE RAT; MulteFire), allowing it to increase its coverage by using unlicensed bands concurrently used by other RANs. For example, the cellular network RAN can use an unlicensed 5 GHz band commonly utilized in WLAN RANs. In various implementations, the cellular network RAN operates within the citizens broadband radio services (CBRS) spectrum (e.g., 3.55 GHz to 3.70 GHz). Operating in the CBRS spectrum allows for operation of private wireless networks without FCC licensing requirements.

The networking device 103 includes a cellular base station 104. The cellular base station 104 provides the UE 101 with connectivity to the cellular network. In various implementations, the cellular base station 104 is an "eNodeB", such as may be used in LTE deployments. In various implementations, the cellular base station 104 is "gNodeB", such as may be used in 5G deployments. In various implementations, the cellular base station 104 can communicate with the UE 101 through one or more IP (Internet Protocol) traffic flow channels. For example, in an LTE deployment, the IP traffic flows channels may be referred to as bearers.

In various implementations, at least one of the cellular base station 104 and the WLAN access point 105 operates within the citizens broadband radio services (CBRS) spectrum (e.g., 3.55 GHz to 3.70 GHz). In various implementations, the cellular base station 104 operates at least in part using unlicensed channels (e.g., LTE-U, MulteFire). In various implementations, at least one of the cellular base station 104 and the WLAN access point 105 operates at least in part using licensed and unlicensed channels (e.g., license assisted access (LAA)).

The networking device 103 includes a traffic unifier 106. The traffic unifier 106 encapsulates cellular network traffic (e.g., from cellular base station 104) and WLAN traffic (e.g., from the access point 105) using a common protocol. In various implementations, the common protocol includes a control protocol. For example, in various implementations, the common protocol is a control and provisioning of wireless access points (CAPWAP) protocol. The encapsulated traffic is provided to a traffic controller 107. This provides the traffic controller 107 with visibility into both sets of traffic (e.g., WLAN and cellular), including traffic flows, quantity and types of traffic, and parameters indicating how upstream and downstream traffic should be treated (e.g. quality of service (QoS); access control list (ACL) for policy enforcement; bandwidth). For example, in various implementations, the parameters can be indicated by DSCP (differentiated services code point) markings. For example, in various implementations, the parameters can indicate how traffic travelling on a particular channel should be treated (e.g., GBR (guaranteed bit-rate) vs. non-GBR (non-guaranteed bit-rate) in an LTE deployment).

The encapsulated traffic can include data, authentication, and/or control traffic. In various implementations, the traffic unifier 103 or portions thereof resides within the cellular base station 104. In various implementations, the traffic unifier 103 or portions thereof resides within the WLAN access point 105. In various implementations, the traffic unifier 103 or portions thereof resides outside of the cellular base station 104 and outside of the WLAN access point 105. In various implementations, different types of traffic are encapsulated at different portions of traffic unifier 103. For example, in various implementations, data traffic is encapsulated at a portion of the traffic unifier 103 at the cellular base station 104 while control traffic is encapsulated at a portion of the traffic unifier 103 at the access point 105.

The wireless communications environment 100 includes a traffic controller 107. In various implementations, the traffic controller 107 forwards received encapsulated traffic to a policy controller, obtains policy instructions from the policy controller based on the forwarded encapsulated traffic, and applies the policies to traffic destined for the UE 101. In various implementations, all or a portion of the traffic controller 107 resides at a wireless LAN controller (e.g., WLC). In various implementations, all or a portion of the traffic controller 107 resides at a core network 108 of the cellular network (e.g., "Evolved Packet Core (EPC)" in LTE). For example, in various implementations, all or a portion of the traffic controller 107 resides at a control node (e.g., a "mobile management entity (MME)" node in LTE) of the core network 108. For example, in various implementations, all or a portion of the traffic controller 107 resides at a forwarding node (e.g., a "serving gateway (SGW)" node in LTE) of the core network 108. For example, in various implementations, all or a portion of the traffic controller 107 resides at a node (e.g., a "packet data network gateway (PDN-GW)" node in LTE) that provides connectivity between the core network 108 and an external network 109 (e.g., the Internet). In various implementations, all or a portion of the traffic controller 107 is virtualized (e.g., located at a virtual location).

Figure 2:
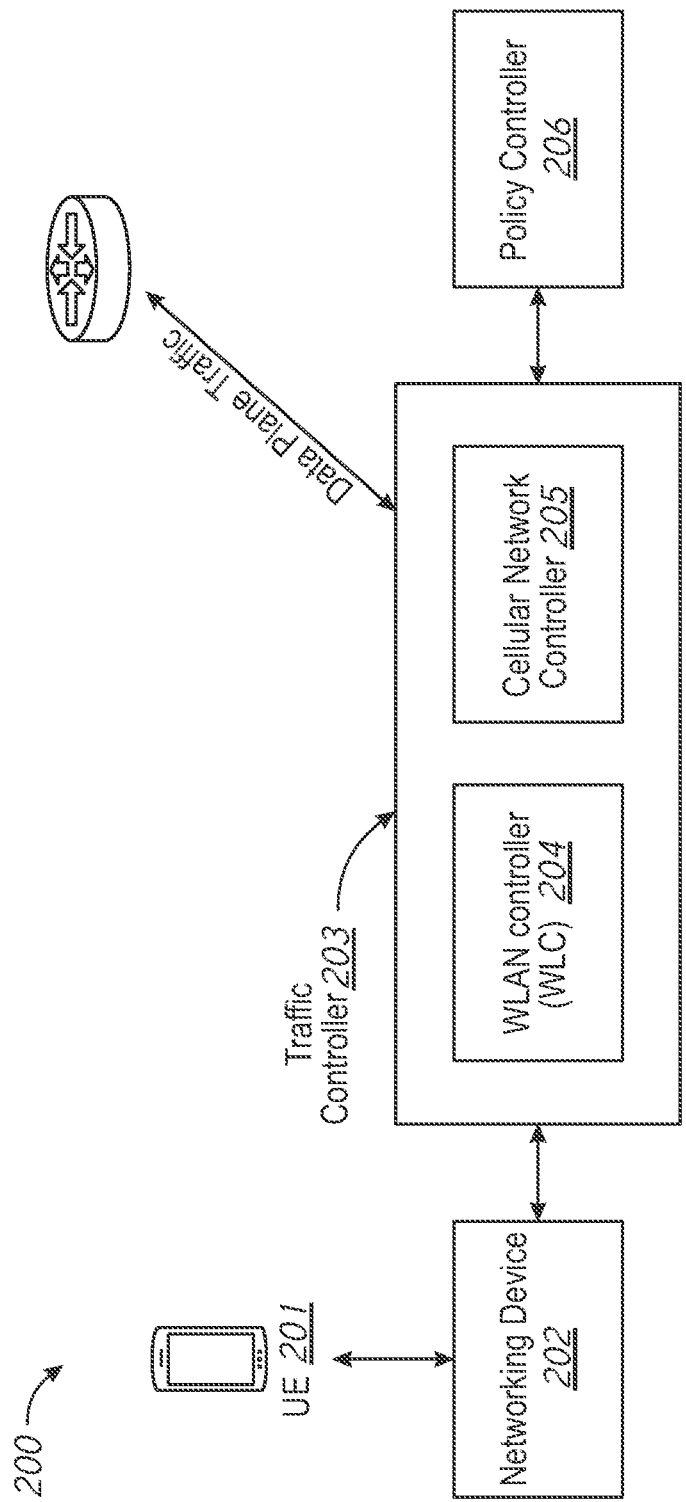
FIG. 2 is a conceptual diagram of a traffic manager.

FIG. 2 is a conceptual diagram of a traffic manager 200. The traffic manager 200 includes a UE 201 and a networking device 202. In various implementations, the networking device 202 (or at least one or more portions of the networking device 202) resides at the networking device 103. In various implementations, the UE 201 provides the networking device 202 with cellular network data traffic, WLAN data traffic, and/or control traffic. The networking device 202 encapsulates the traffic and provides the encapsulated traffic to a traffic controller 203. In various implementations, the encapsulation of the different types of traffic is performed by using a common protocol (e.g., CAPWAP).

The traffic manager 200 includes a traffic controller 203 that provides the encapsulated control traffic associated with one or more networks (e.g., cellular network, WLAN) to a policy controller 206. In various implementations, the traffic controller 203 (or at least one or more portions of the traffic controller 203) resides at the traffic controller 107. The traffic controller 203 includes a WLAN controller (WLC) 204 and a cellular network controller 205.

In various implementations, the policy controller 206, based on the received encapsulated control traffic from the traffic controller 203, can determine policies (e.g., enterprise policies) to facilitate network control (e.g., UE access to services rendered by RANs), authentication, and/or data traffic control. In various implementations, these policies are related to: control, authentication, data traffic control, security, and/or quality of experience (QoE). The QoE can indicate a priority allocated to certain types of traffic and/or applications, based on various policies such as user type, user contract, device type, application type, traffic path, location, and/or network conditions. In various implementations, the policy controller 206 determines policies to be applied to the wireless infrastructure (e.g., WLC 204 and corresponding access points) and/or to the wired network (e.g., cellular network controller 205 and corresponding cellular base stations). In various implementations, the policies can be applied to the UE 201 at regular intervals, or upon satisfaction of a criteria or threshold (e.g., based on RF conditions or detection of a particular type of traffic).

In various implementations, an enforcement module at the networking device 202 can obtain the traffic policies determined by the policy controller 206. The obtained traffic policies are based at least in part on the encapsulated cellular traffic and encapsulated WLAN traffic provided by the networking device 202. In various implementations, the enforcement module at the networking device 202 can apply the obtained traffic policies to WLAN traffic and cellular network traffic.

In various implementations, the policy is static. For example, in various implementations, the policy is based on a threshold or criteria being satisfied (e.g., throughput, bandwidth, flow rates, etc.). For example, in various implementations, the policy can be used for steering traffic between networks.

In various implementation, the policy is dynamic, meaning it can change in real time based on changing traffic flows (e.g., between UE and WLAN and between UE and cellular network) and/or conditions of the WLAN and/or cellular network. For example, in various implementations, the policy can include instructions for the UE 201 to utilize a particular radio in routing high priority traffic (e.g. VoLTE (voice over LTE), WiFi calling), wherein the radio is at the time capable of routing the high priority traffic with high reliability.

In various implementation, the policy is predictive, meaning it is based at least in part on previously received encapsulated traffic.

In various implementations, the policy controller 206 is an infrastructure controller that functions to allow requirements of applications to define the network by enabling the applications to directly connect with a shared resource pool that includes network, compute, and storage capabilities— e.g., Cisco application policy infrastructure controller (APIC) and/or Cisco application policy infrastructure controller enterprise module (APIC-EM). In various implementations, the policy controller 206 determines one or more policies for implementing one or more of the following non-exhaustive listed functionalities: automating deployment of physical and virtual network services on any platform; automating branch-router configuration and management with a software-defined WAN (wide area network); deploying routers, switches, and/or wireless controllers without human intervention; viewing of paths to simplify and accelerate troubleshooting of connectivity problems; using quality of service (QoS) to prioritize applications across RANs; obtaining integrity measurements from monitored devices (e.g., UE 201), evaluating these measurements for correctness and unexpected changes, and getting visibility into the results; simplifying network discovery and find security alerts that apply to devices (e.g., UE 201); and/or enabling policy-based discovery and distribution across a user-defined network. In various implementations, the policy controller 206 works in conjunction with a network platform providing analytics and/or assurance functionality (e.g., Cisco NDP (network data platform)). In various implementations, the policy controller 206 works in conjunction with an engine that provides access control and access policy enforcement (e.g., Cisco ISE (identity services engine)).

Network Control

In various implementations, the traffic manager 200 provides the UE 201 with access to services rendered by the RANs (e.g., WLAN and cellular network). Based on the received encapsulated traffic, the traffic controller 203 can facilitate network control of multiple networks (e.g., WLAN and cellular network) vis-à-vis the UE 201.

Network control can be exercised by the traffic controller 203 in a variety of ways. For example, in various implementations, the traffic controller 203 facilitates synchronizing the UE 201 to a cellular network in both downlink and uplink directions. As another example, in various implementations, the traffic controller 203 facilitates resolving situations wherein multiple UEs are simultaneously attempting to access the cellular network. As yet another example, in various implementations, the traffic controller 203 responds to an initial attach request (e.g., for Internet connectivity) provided by the UE 201—e.g., a non-access stratum (NAS) attach request. As yet another example, in various implementations, the traffic controller 203 responds to a UE 201 detach request in the event the UE 201 no longer requires services from the cellular network. As another example, in various implementations, the traffic controller 203 responds to a UE 201 request for services after the UE 201 has successfully attached to the cellular network. As yet another example, in various implementations, the traffic controller 203 facilitates paging to the UE 201.

In various implementations, the traffic controller 203 includes a WLC 204 that resides in the same enclosure as the cellular network controller 205 (e.g., "co-located"). The cellular network controller 205 can include a cellular core network control node (e.g., a mobile management entity (MME) in an LTE deployment) and a cellular core network forwarding node (e.g., a serving gateway (SGW) node in an LTE deployment).

In various implementations, the traffic controller 203 includes a WLC 204 that is enclosed separately from the cellular network controller 205 (e.g., not "co-located"). The cellular network controller 205 can include the cellular core network control node. In various implementations, the WLC 204 re-encapsulates the encapsulated traffic via a transport-layer protocol (e.g., stream control transmission protocol (SCTP)) and provides the re-encapsulated traffic to the cellular network controller 205 over a control plane.

In various implementations, the traffic controller 203 provides encapsulated control traffic to the policy controller 206. In various implementations, the policy controller 206 obtains authentication, accounting, and/or authorization (AAA) information and, based on the AAA information, determines a policy for facilitating network control. In various implementations, the policy controller 206 obtains the information via a remote authentication dial-in user service (RADIUS) protocol. In various implementations, the information is obtained through RADIUS over a trusted or secured channel. For example, in various implementations, the information is obtained through RADIUS over a transport layer security (TLS) protocol (e.g., user datagram protocol (UDP)). For example, in various implementations, a particular UE is not allowed to associate with a RAN because the policy controller 206 has indicated that the UE is not authorized to do so (e.g., the UE is blacklisted).

Authentication

Continuing with FIG. 2, in various implementations, the traffic manager 200 facilitates authentication of the UE 201. Authentication can be used to associate the UE 201 to technologies, allowing services to be rendered to the UE 201 including paging, location services, emergency services, warnings, etc. In various implementations, the traffic controller 203 works in conjunction with the policy controller 206. In various implementations, the policy controller 206 obtains authentication, accounting, and/or authorization (AAA) information from the traffic controller 203 to facilitate authentication. In various implementations, the policy controller 206 obtains the information via a remote authentication dial-in user service (RADIUS) protocol. In various implementations, the information is obtained through RADIUS over a transport layer security (TLS) protocol (e.g., user datagram protocol (UDP)). For example, in various implementations, a particular UE is authenticated after it is determined that its credentials match an entry in a list of approved credentials obtained from the policy controller 206.

In various implementations, the WLC 204 validates an identity of the UE 201 through an identifier provided by the UE 201, and the cellular network controller 205 uses the identifier to validate the user for the cellular network. In various implementations, the cellular network controller 205 validates the identity of the UE 201 through an identifier provided by the UE 201, and the WLC 204 uses the identifier to validate the UE 201 for the WLAN, by using for example, an extensible authentication protocol (EAP) and/or related protocols (e.g., extensible authentication protocol subscriber identity module (EAP-SIM) and/or extensible authentication protocol authentication and key agreement (EAP-AKA)). The identity of the UE 201 can be provided by the UE 201 through a number of means, including by the UE 201 providing a unique user identifier (e.g. IMSI (international mobile subscriber identity) and/or pseudonym).

Figure 3:
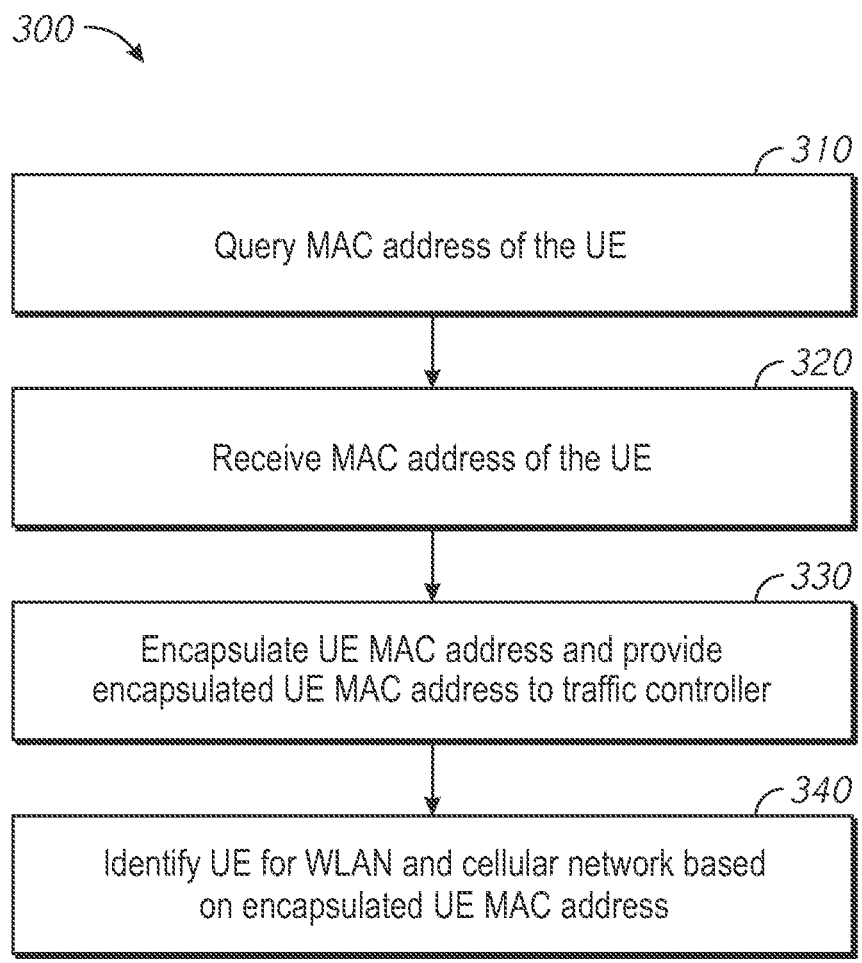
FIG. 3 depicts a method of authentication based on cellular base station querying.

FIG. 3 depicts a method 300 of authentication based on cellular base station querying. With continued reference to FIG. 2, at step 310, the cellular base station (at the networking device 202) sends a query to the UE 201 for the MAC (media access control) address of the UE 201. In various implementations, the query is sent over a protocol existing at a level between the UE 201 and the cellular base station—e.g., a radio resource control (RRC) protocol in an LTE deployment. At step 320, the MAC address of the UE 201 is received at the networking device 202. At step 330, the networking device 202 encapsulates the UE MAC address and provides the encapsulated UE MAC address, either through the cellular base station or a WLAN access point, to the traffic controller 203. At step 340, the WLC 204 and/or the cellular network controller 205 can identify the UE 201 for both the WLAN and cellular networks based on the encapsulated UE MAC address. In various implementations, the UE 201 is identified for the purpose of authentication, such as to validate credentials of the UE 201. In various implementations, the UE 201 is identified for the purpose of correlating the identity of the UE 201 on multiple mediums, such as to confirm that traffic coming from a station "A" through a cellular network and from client "B" through WLAN originated from the same UE 201. The WLC 204 and the cellular network controller 205 exchange identity information (e.g. MAC address). In various implementations, the WLC 204 is co-located with the cellular network controller 205. In various implementations, the WLC 204 is located in an enclosure separate from the cellular network controller 205 and they exchange information over an encrypted tunnel. In various implementations, authentication is performed based on policy information obtained from the policy controller 206—e.g., a list of approved MAC addresses.

Data Traffic Control

Figure 4:
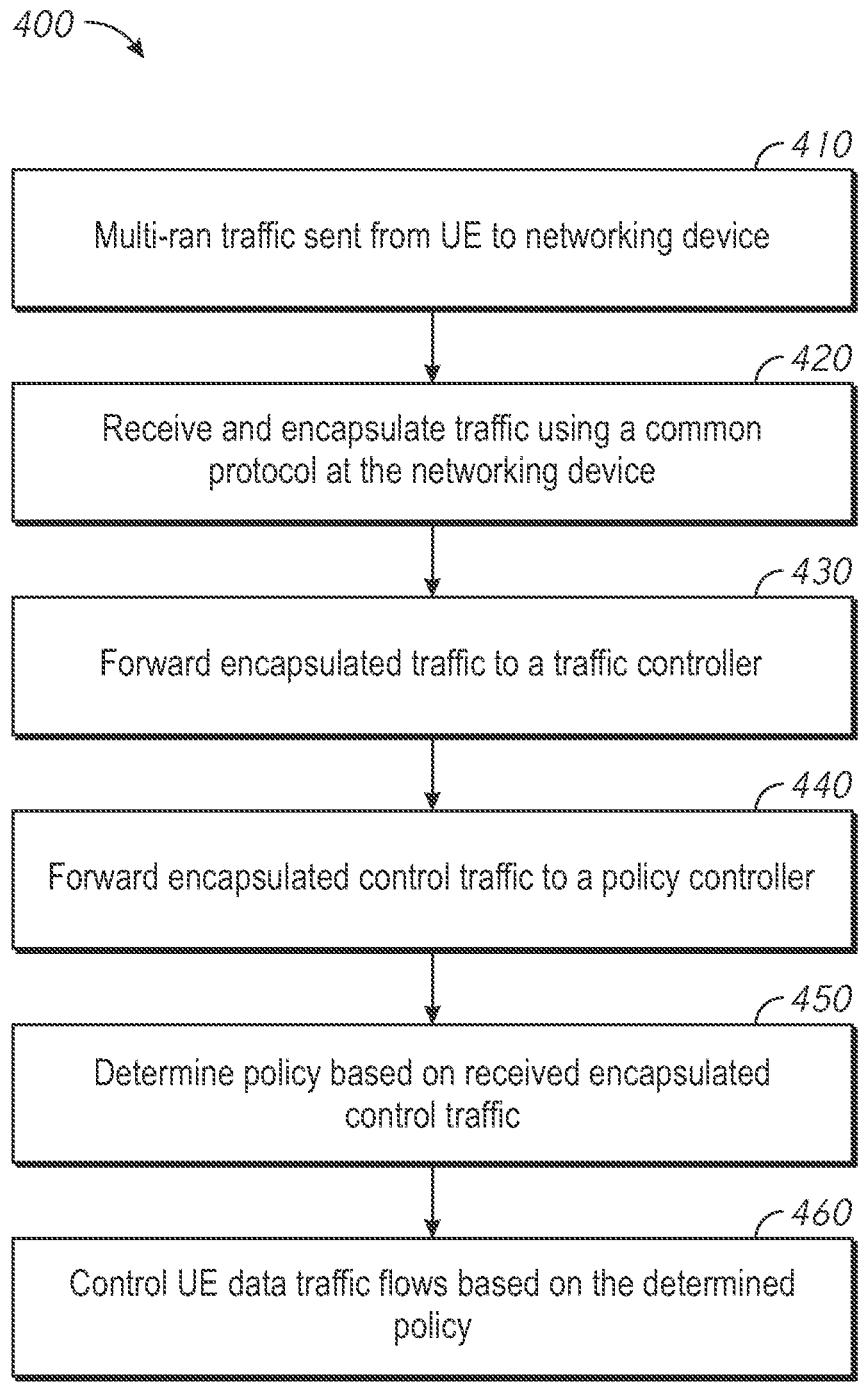
FIG. 4 depicts a method of data traffic control.

FIG. 4 depicts a method 400 of data traffic control. With continued reference to FIG. 2, at step 410, a UE 201 sends cellular network traffic and WLAN traffic to a networking device 202. At step 420, the networking device 202 receives the sets of traffic and encapsulates both sets of traffic using a common protocol (e.g., CAPWAP). At step 430, the networking device 202 forwards the encapsulated traffic to a traffic controller 203.

At step 440, the traffic controller 203 forwards encapsulated control traffic to the policy controller 206. In various implementations, the traffic controller 203 forwards the encapsulated control traffic via a network traffic monitoring application (e.g., Cisco NetFlow).

In various implementations, the traffic controller 203 includes a co-located WLC 204 and cellular core network forwarding node (e.g., S-GW in LTE deployment). A co-located WLC and cellular core networking forwarding node provides the WLC with visibility into both UE cellular network traffic and UE WLAN traffic.

In various implementations, the traffic controller 203 includes a WLC 204 that is not co-located with cellular core network elements (e.g., MME and/or S-GW in LTE). In various implementations, the WLC can remove the encapsulation from the received encapsulated traffic, and re-encapsulate the traffic according to a protocol that is suitable for routing the traffic to the cellular core networks. For example, the re-encapsulation can be performed according to a transport-layer protocol (e.g., stream control transmission protocol (SCTP)) and sent to a cellular core network node. In various implementations, at the networking device 203, a cellular based protocol (e.g., GTP-U (GPRS Tunnelling Protocol user data tunneling)) can be used to encapsulate traffic destined for the cellular core network forwarding node (e.g., S-GW in LTE). The WLC 204 can recognize data traffic using a deep packet inspection application (e.g., Cisco NBAR).

At step 450, based on the received encapsulated control traffic, network conditions, and/or predetermined network policies (e.g., user group, traffic type, etc.), the policy controller 206 can determine one or more policies indicating how to treat UE traffic with respect to the WLAN and the cellular network. In various implementations, the policy includes scheduling UE traffic across a particular link (e.g., WLAN link, cellular network link)—e.g., "load balancing" and/or "path control." For example, in various implementations, the policy is based on obtained parameters indicating how traffic should be treated by RANs 102. Examples of the parameters include but are not limited to: quality of service (QoS) (e.g., upstream, downstream, bandwidth, traffic remarking, policing, shaping, buffering, prioritizing, etc.), RSSI (received signal strength indicator), estimated throughput, subscription rate, latency, error rate, network load, transmission rates and/or reception rates. In various implementations, the policy includes a method for encrypting traffic. In various implementations, the policy includes instructions for connecting the UE 201 to more than one RAN (e.g., "multi-homing").

At step 460, UE data traffic flows (e.g. WLAN data traffic and cellular network data traffic) are controlled based on the determined policy. In various implementations, the traffic controller 203 controls the UE data traffic based on the determined policy. For example, if the policy indicates that the WLAN link is being over-utilized, the traffic controller 203 can route more UE traffic along the cellular network link. For example, if the policy indicates that OTT (over the top) applications (e.g., FaceTime) have a high priority, the traffic controller 203 can instruct OTT applications running on the UE 201 to utilize the UE radio having the higher throughput. For example, in various implementations, if the policy indicates that only 100 UEs can connect to the WLAN and 100 UEs are current connected to the WLAN, then the traffic controller 203 can instruct a UE attempting to route traffic through the WLAN link to instead use its cellular network radio for communications.

Figure 5:
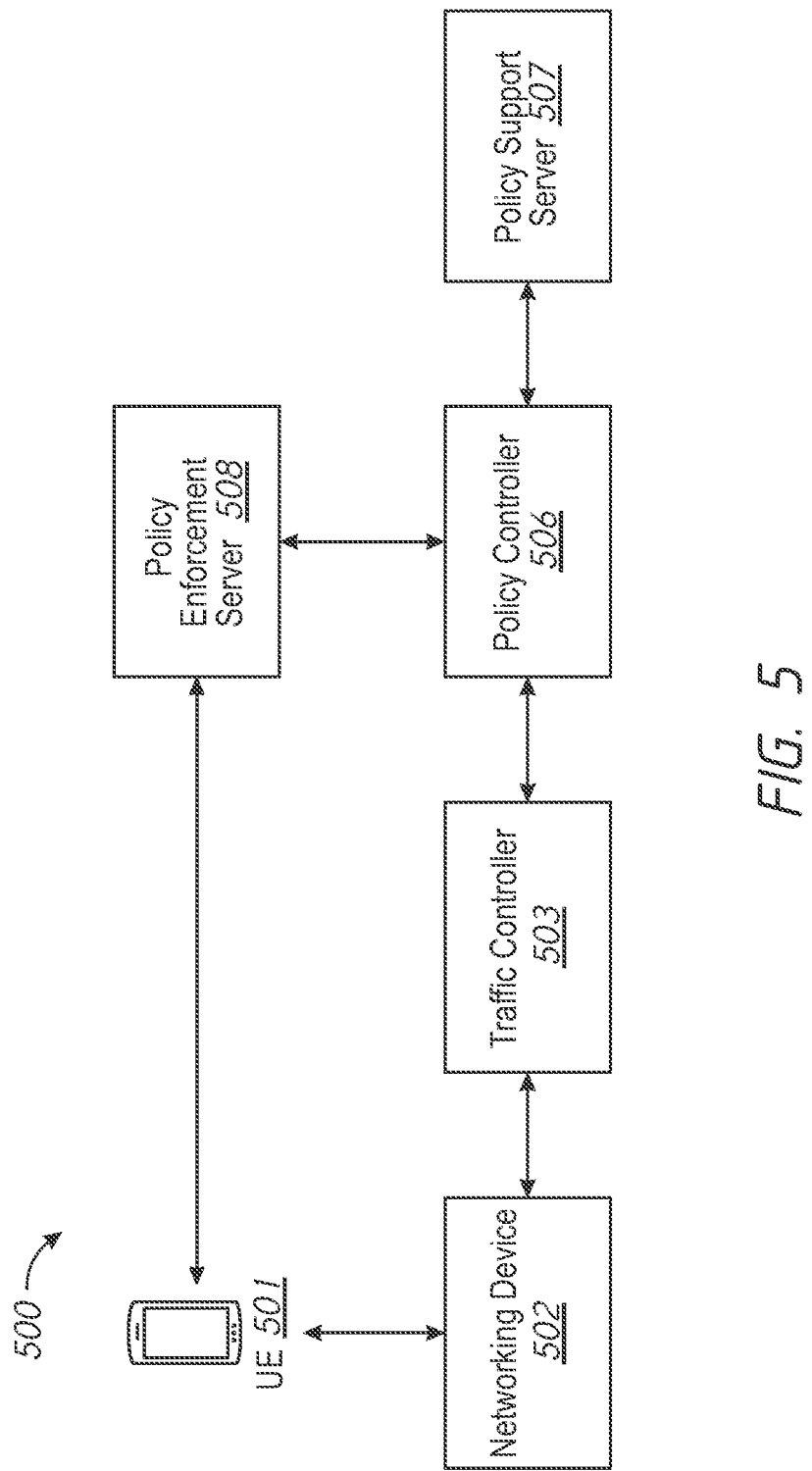
FIG. 5 is a conceptual diagram of a server-based traffic manager.

FIG. 5 is a conceptual diagram of a server-based traffic manager 500. The server-based traffic manager 500 includes a networking device 502. In various implementations, some or all parts of the networking device 502 are included in the networking device 202. The server-based traffic manager 500 includes a traffic controller 503. In various implementations, some or all parts of the traffic controller 503 are included in the traffic controller 203. The server-based traffic manager 500 includes a policy controller 506. In various implementations, some or all parts of the policy controller 503 are included in the traffic controller 206.

In various implementations, the server-based traffic manager 500 includes a policy support server 507. The policy support server 507 can work in conjunction with the policy controller 506 to determine a policy. In various implementations, the policy support server 507 provides the policy controller 506 with visibility into traffic types travelling through one or more RAN. For example, in various implementations, the policy support server 507 provides the policy controller 506 with information about applications running on a network so that the policy controller 506 can determine specific policies for the applications. In various implementations, the policy support server 507 is a MEC (mobile edge computing) server.

In various implementations, the server-based traffic manager 500 includes a policy enforcement server 508. In various implementations, the policy enforcement server 506 works in conjunction with the policy controller 506 to apply determined policies to the UE 501. The policy enforcement server 508 functions in part to support the UE 501 in discovering discover non-cellular networks (e.g. WLAN, such as WiFi). For example, in various implementations, the policy enforcement server 508 is an ANDSF (access network discovery and selection function) server, such as Cisco CPS, that provides the policies to the UE 501 over a S14 interface. For example, in various implementations, the policy enforcement server 508 can instruct the UE 501 to utilize a particular radio for traffic associated with a particular application if a threshold relating to network condition(s) is breached.

In various implementations, the server-based traffic manager 500 includes the policy support server 507 but not the policy enforcement server 508. In various implementations, the server-based traffic manager 500 includes the policy enforcement server 508 but not the policy support server 507. In various implementations, the server-based traffic manager 500 includes both the policy enforcement server 508 and the policy support server 507.

Figure 6:
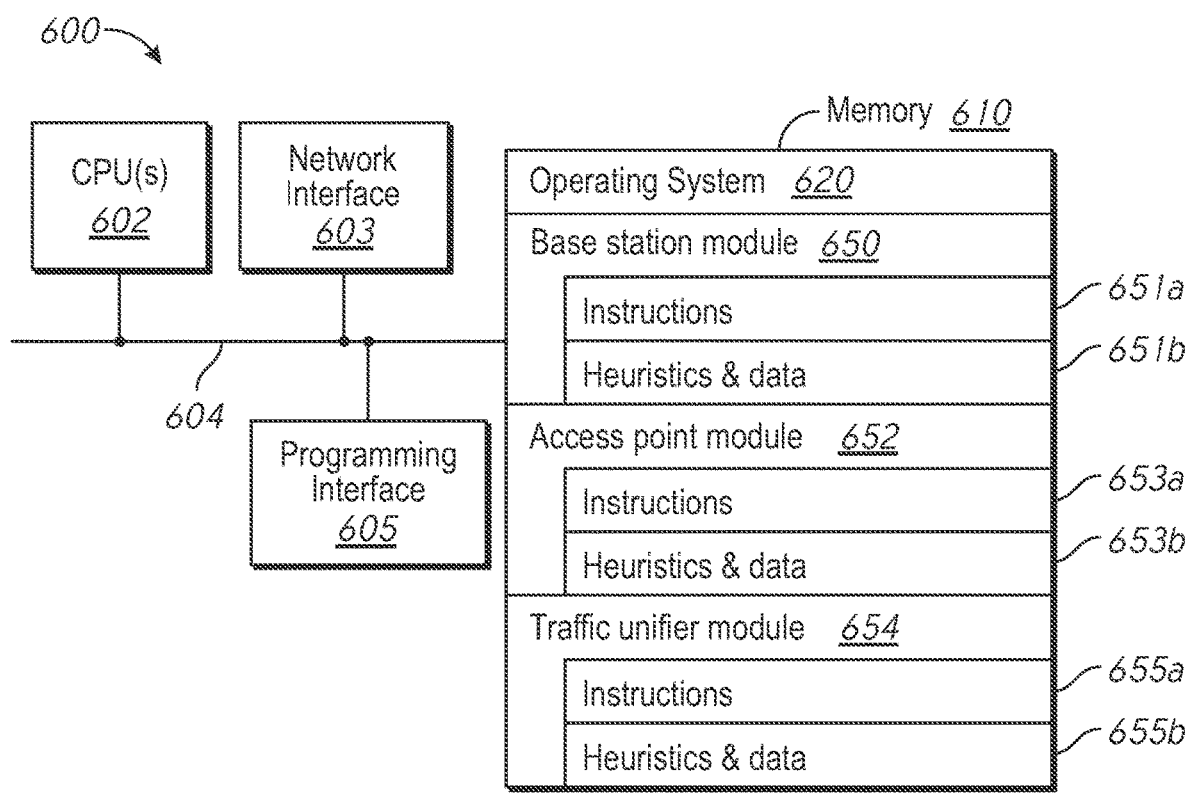
FIG. 6 is a block diagram of an example of a networking device in accordance with some implementations.

FIG. 6 is a block diagram of an example of a networking device 600 in accordance with some implementations. For example, in some implementations, the networking device 600 is similar to and adapted from the networking device 103 in FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the networking device 600 includes one or more processing units (CPU's) 602, a network interface 603, a memory 610, a programming (I/O) interface 605, and one or more communication buses 604 for interconnecting these and various other components. In some implementations, the one or more communication buses 604 include circuitry that interconnects and controls communications between system components.

The memory 610 includes high-speed random access memory, such as DRAM, SRAM, DDR RAM, or other random access solid state memory devices. In some implementations, the memory 610 includes non-volatile memory, such as one or more magnetic disk storage devices, optical disk storage devices, flash memory devices, or other non-volatile solid state storage devices. The memory 610 optionally includes one or more storage devices remotely located from the one or more CPUs 602. The memory 610 comprises a non-transitory computer readable storage medium. In some implementations, the memory 610 or the non-transitory computer readable storage medium of the memory 610 stores the following programs, modules and data structures, or a subset thereof including an optional operating system 620, a base station module 650, an access point module 652, and a traffic unifier module 654.

The operating system 620 includes procedures for handling various basic system services and for performing hardware dependent tasks.

The base station module 650 is configured to provide a UE (e.g., laptop, tablet, mobile phone) with connectivity to a cellular network according to various implementations describe in this application. To that end, in various implementations, the base station module 650 includes instructions and/or logic 651a, and heuristics and data 651b.

The access point module 652 is configured to provide the UE with connectivity to a Wireless Local Area Network (WLAN) (e.g., WiFi) according to various implementations describe in this application. To that end, in various implementations, the access point module 652 includes instructions and/or logic 653a, and heuristics and data 653b.

The traffic unifier module 654 is configured to, using a common protocol, encapsulate cellular network traffic obtained from the base station module 650 and encapsulate WLAN traffic obtained from the access point module 660, and provide the encapsulated cellular network traffic and encapsulated WLAN traffic to a controller (e.g., traffic controller 203). To that end, in various implementations, the traffic unifier module 654 includes instructions and/or logic 655a, and heuristics and data 655b.

FIG. 6 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining, at a networking device housing a cellular base station and a Wireless Local Area Network (WLAN) access point, cellular network traffic of a cellular network from an electronic device;
obtaining, at the networking device, WLAN traffic from the electronic device;
encapsulating, at the networking device, the cellular network traffic and the WLAN traffic using a common protocol to produce encapsulated cellular traffic and encapsulated WLAN traffic;
providing the encapsulated cellular traffic and the encapsulated WLAN traffic to a traffic controller configured to provide the encapsulated cellular traffic and the encapsulated WLAN traffic to a policy controller configured to determine a traffic policy based on the encapsulated cellular traffic, the encapsulated WLAN traffic, a priority of the encapsulated cellular traffic, and a priority of the encapsulated WLAN traffic, wherein the traffic policy includes instructions relating to authentication of the electronic device, and wherein the traffic controller resides at a control node of a core network of the cellular network and a WLAN controller co-located with the control node;
obtaining the traffic policy at the networking device from the traffic controller; and
applying the traffic policy at the networking device.

2. The method of claim 1, wherein the common protocol includes a control and provisioning of wireless access points protocol.

3. The method of claim 1, wherein the policy controller is further configured to determine the traffic policy based further at least in part on at least one of:
network conditions of the cellular network, or network conditions of the WLAN.

4. The method of claim 1, wherein the traffic policy includes instructions for the electronic device relating to at least one of control and data.

5. The method of claim 1, wherein the traffic controller further resides at at least one of:
a forwarding node of the core network of the cellular network; or
a node that provides connectivity between the core network of the cellular network and an external network.

6. The method of claim 1, wherein at least one of the cellular base station or the WLAN access point operates within a citizens broadband radio services spectrum of 3.55 GHz to 3.70 GHz.

7. The method of claim 1, wherein the cellular base station operates at least in part over licensed and unlicensed channels.

8. A networking device comprising:
a cellular base station configured to obtain cellular network traffic of a cellular network from an electronic device; and
a Wireless Local Area Network (WLAN) access point configured to obtain WLAN traffic from the electronic device, wherein the networking device is configured to:
encapsulate the cellular network traffic and the WLAN traffic using a common protocol to produce encapsulated cellular traffic and encapsulated WLAN traffic;
provide the encapsulated cellular traffic and the encapsulated WLAN traffic to a traffic controller configured to provide the encapsulated cellular traffic and the encapsulated WLAN traffic to a policy controller configured to determine a traffic policy based on the encapsulated cellular traffic, the encapsulated WLAN traffic, a priority of the encapsulated cellular traffic, and a priority of the encapsulated WLAN traffic, wherein the traffic policy includes instructions relating to authentication of the electronic device, and wherein the traffic controller resides at a control node of a core network of the cellular network and a WLAN controller co-located with the control node;
obtain the traffic policy from the traffic controller; and
apply the traffic policy.

9. The networking device of claim 8, wherein the common protocol includes a control and provisioning of wireless access points protocol.

10. The networking device of claim 8, wherein the traffic policy is obtained by the traffic controller from the policy controller.

11. The networking device of claim 8, wherein the traffic policy further includes instructions for the electronic device relating to at least one of control and data.

12. The networking device of claim 8, wherein the traffic controller further resides at at least one of:
a forwarding node of the core network of the cellular network; or
a node that provides connectivity between the core network of the cellular network and an external network.

13. The networking device of claim 8, wherein at least one of the cellular base station or the WLAN access point operates within a citizens broadband radio services spectrum of 3.55 GHz to 3.70 GHz.

14. The networking device of claim 8, wherein the cellular base station operates at least in part over licensed and unlicensed channels.

15. A non-transitory memory storing one or more programs, the one or more programs comprising instructions, which, when executed by one or more processors of a networking device, cause the networking device to:
   obtain cellular network traffic of a cellular network from an electronic device;
   obtain WLAN traffic from the electronic device;
   encapsulate, at the networking device, the cellular network traffic and the WLAN traffic using a common protocol to produce encapsulated cellular traffic and encapsulated WLAN traffic;
   provide the encapsulated cellular traffic and the encapsulated WLAN traffic to a traffic controller configured to provide the encapsulated cellular traffic and the encapsulated WLAN traffic to a policy controller configured to determine a traffic policy based on the encapsulated cellular traffic, the encapsulated WLAN traffic, a priority of the encapsulated cellular traffic, and a priority of the encapsulated WLAN traffic, wherein the traffic policy includes instructions relating to authentication of the electronic device, and wherein the traffic controller resides at a control node of a core network of the cellular network and a WLAN controller co-located with the control node;
   obtain, from the traffic controller, the traffic policy; and
   apply the traffic policy.

16. The non-transitory memory of claim 15, wherein the common protocol includes a control and provisioning of wireless access points protocol.

17. The non-transitory memory of claim 15, wherein the policy controller is further configured to determine the traffic policy based further at least in part on at least one of:
   network conditions of the cellular network, or
   network conditions of the WLAN.

18. The non-transitory memory of claim 17, wherein the traffic policy includes instructions for the electronic device relating to at least one of control and data.

19. The non-transitory memory of claim 15, wherein the traffic controller further resides at at least one of:
   a forwarding node of the core network of the cellular network; or
   a node that provides connectivity between the core network of the cellular network and an external network.

20. The non-transitory memory of claim 15, wherein the networking device operates at least in part over licensed and unlicensed channels.

* * * * *